D. BEAUMONT.
ORE-WASHER.
No. 190,808. Patented May 15, 1877.
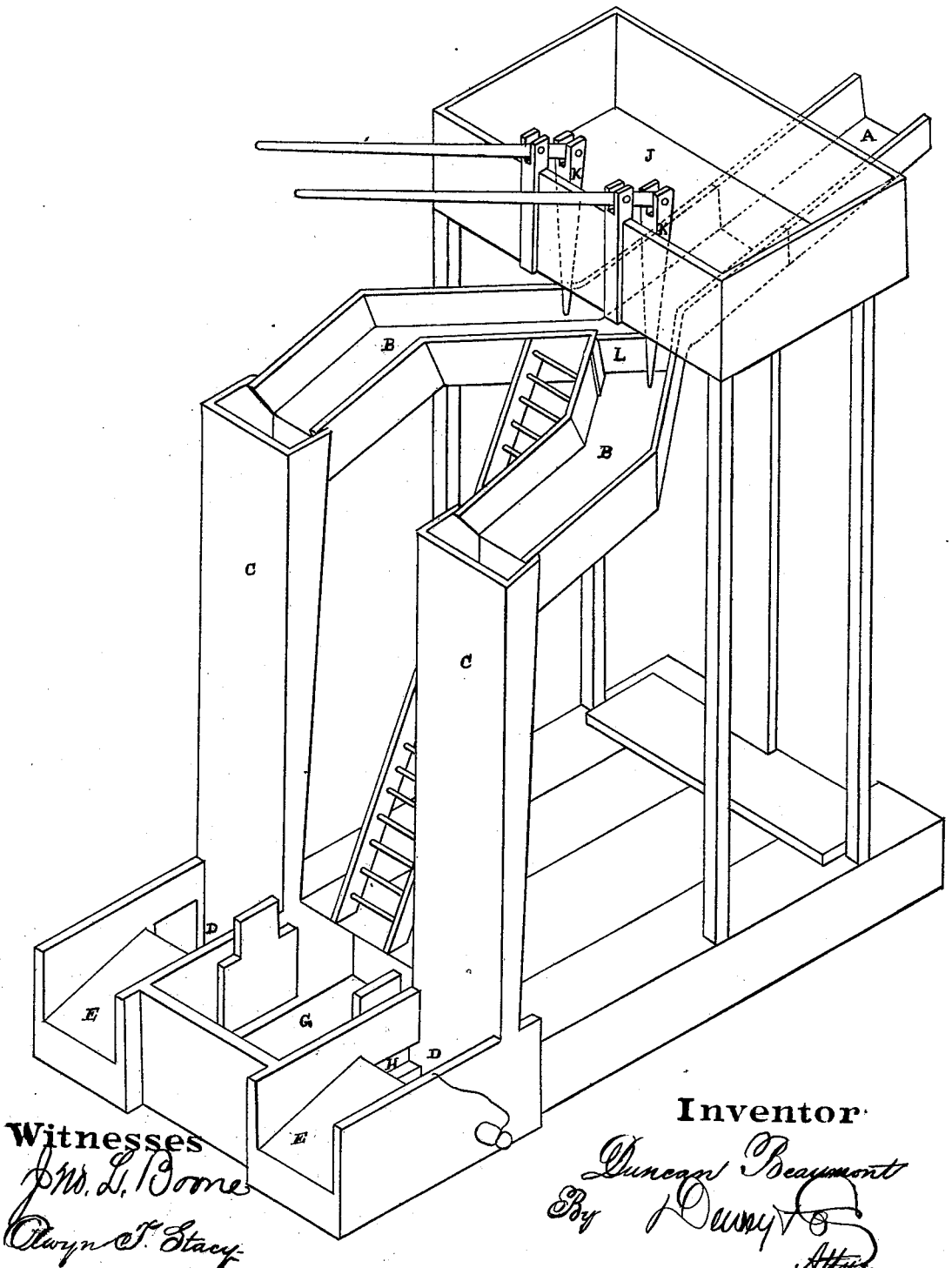
Witnesses
Inventor
Duncan Beaumont
By Denny
Attys.

UNITED STATES PATENT OFFICE.

DUNCAN BEAUMONT, OF SACRAMENTO, CALIFORNIA.

IMPROVEMENT IN ORE-WASHERS.

Specification forming part of Letters Patent No. 190,808, dated May 15, 1877; application filed April 3, 1877.

*To all whom it may concern:*

Be it known that I, DUNCAN BEAUMONT, of the city and county of Sacramento and State of California, have invented an Improved Gold-Saving Apparatus; and I do hereby declare the following to be a full, clear, and exact description thereof, reference being had to the accompanying drawing.

My invention relates to an improved apparatus for saving the fine particles of gold, silver, mercury, and sulphurates, which are contained in tailings and loose earth.

My improvement consists in combining with a mining sluice or flume two branch sluice-ways, each of which leads to a vertical pen-stock, the lower end of which terminates in a tank of quicksilver.

The branch sluices are so arranged that either one can be closed so as to direct the material which is passing down the sluice or flume alternately into one and the other for the purpose of cleaning up. A tank for containing clear water is mounted above the branch sluices, so that clear water can run through the closed sluice for washing and cleaning the accumulated material, all as hereinafter more fully described.

Referring to the accompanying drawing, in which Figure 1 is a perspective view, let A represent a main flume or sluice, such as is used for conducting tailings or auriferous earth from mills or mines.

At the lower end of this sluice or flume I construct two branch sluices, B B, each of which leads to a pen-stock, C. The lower end of each pen-stock terminates in a box or cavity, D, which is partially filled with mercury, so that when the material which enters the pen-stock has accumulated to a sufficient height it will be gradually forced down into and through the mercury, so as to rise in the box outside of the pen-stock, and be carried away down the extension or lower sluice E, which leads from the box. During its passage through the mercury the fine particles of gold, silver, and amalgam contained in the tailings or earth will be brought into intimate contact with the mercury, and amalgamated, while the lighter portion will be carried away down the overflow, sluice E. The sulphurates, being heavier than the water and earth, will also accumulate in the box upon the mercury.

G is an intermediate box, which is placed between the two boxes D D. An opening, H, is made in the partition between each of the boxes D and the intermediate box G, which can be kept closed by a door, when the stream of tailings is passing through the box.

J is an elevated tank or reservoir, which is mounted above the branch sluices B B, and which is provided with an opening in its bottom over each branch, each of which is closed by a plug or valve, K. This tank or reservoir contains clear water.

L is a partition, which is arranged to fit across the mouth of either branch sluice and close it, so as to direct the water and material in the main sluice into either of the branches, as desired.

In operation, the boxes or receptacles D will be partially filled with quicksilver, and the tailings directed into one of the branches by closing the entrance to the opposite one. The tailings will then be conducted into the pen-stock, where the column of water will force them down under the mercury, so that they will pass through the openings below the pen-stock, and rise to the surface of the mercury in the box outside. During the passage of the tailings through the mercury, the fine particles of gold, silver, or amalgam will be amalgamated and retained in the bottom of the box.

The sulphurates will collect on the surface of the mercury, while the gangue and worthless material will pass off down the tail-flume.

When the sulphurates have accumulated to about the height of the door H, I shift the partition L so as to cut off the stream from the sluice which leads to the charged box, and open the opposite branch. While the same process of separation is going on in the opposite pen-stock and box, I remove the plug or valve K from the bottom of the clear-water reservoir, over the closed sluice, and allow clear water to run through it, so as to wash it out clean. I then open the door H, and remove the accumulated sulphurates to the box G.

This process is thus kept up by alternating the direction of the stream from one branch to the other.

I thus provide a simple and extremely effective amalgamator and concentrator that can be operated with but little trouble, and which will save the small particles of gold, silver, and amalgam, which ordinarily pass off down the flume to waste.

Having thus described my invention, what I claim as new, and desire to secure by Letters Patent, is—

1. The flume or sluice A, with its branch sluices B B, each of which connects with the pen-stock C, the lower end of which terminates in a box or receptacle, D, in which a body of quicksilver is contained, in combination with the partition L, substantially as and for the purpose described.

2. In combination with the alternately-operated sluices B B, pen-stocks C C, and quicksilver-boxes D, the intermediate box G, with its side openings or doors H, arranged to communicate with the boxes D, substantially as and for the purpose described.

3. In combination with the alternately-operated sluices B B, pen-stocks C C, and quicksilver-boxes D D, arranged as described, the elevated water tank or reservoir with its plugs or valves K K, substantially as and for the purpose described.

In witness whereof I have hereunto set my hand and seal.

DUNCAN BEAUMONT. [L. S.]

Witnesses:
RICHMOND DAVIS,
A. C. SWEETSER.